Sept. 9, 1941.  E. F. LOWEKE  2,255,260

BRAKE

Filed June 17, 1939

INVENTOR.
ERWIN F. LOWEKE
BY C. H. Fowler
ATTORNEY.

UNITED STATES PATENT OFFICE 2,255,260

BRAKE

Erwin F. Loweke, Detroit, Mich., assignor to Hydraulic Brake Company, Detroit, Mich., a corporation of California Application June 17, 1939, Serial No. 279,755

9 Claims. (Cl. 188—79.5)

This invention relates to brakes, and more particularly to means for automatically adjusting the friction elements of brakes.

An object of the invention is to provide means for automatically adjusting the friction elements of a brake to compensate for wear of the linings of the friction elements.

Another object of the invention is to provide means for automatically adjusting the friction element of a brake proportionately to wear of the lining on the friction element of the brake.

Another object of the invention is to provide means for automatically adjusting the individual friction elements of a brake proportionately to wear of the linings thereof coupled with means for automatically adjusting the overall length of the friction elements to compensate for the wear of the linings.

Other objects of the invention will appear from the following description taken in connection with the drawing forming a part of this specification, and in which—

Figure 1:
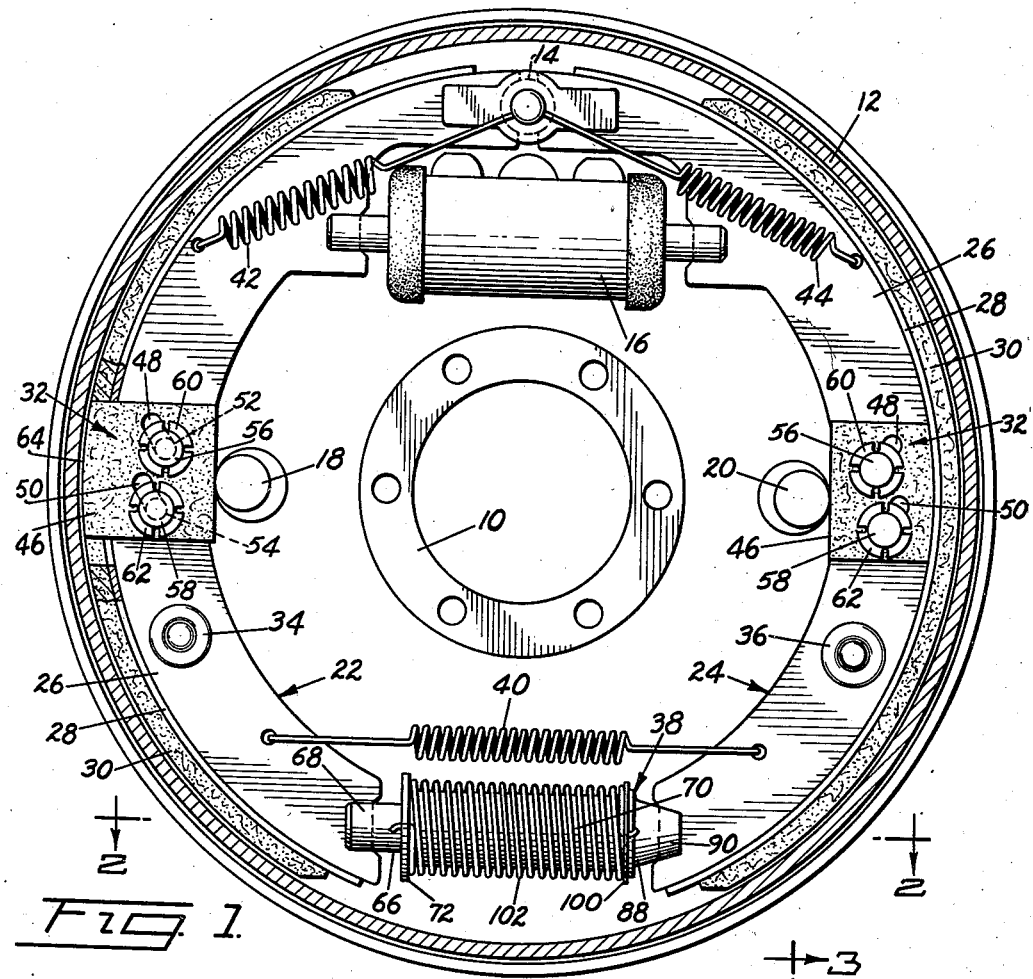
Fig. 1 is a vertical sectional view of a brake embodying the invention.
Figure 2:
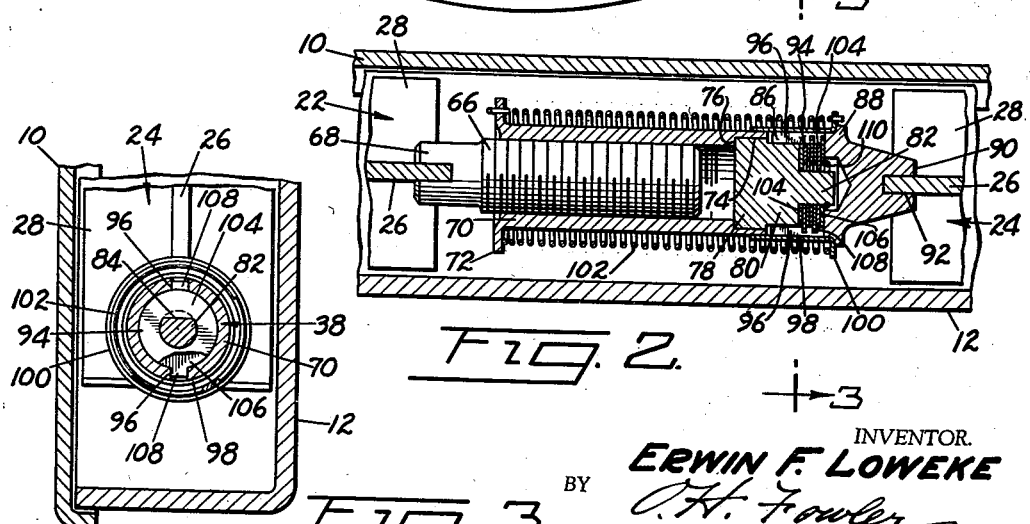
Fig. 2 is a sectional view substantially on line 2—2, Fig. 1.
Figure 3:
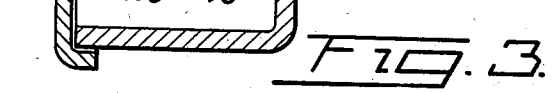
Fig. 3 is a sectional view substantially on line 3—3, Fig. 2.

Referring to the drawing for more specific details of the invention, 10 represents a fixed support or backing plate adapted to be secured to an axle or to an axle housing, and associated with the backing plate is a rotatable drum 12 adapted to be secured to a wheel.

The backing plate has arranged thereon an anchor 14, a fluid pressure actuated motor 16, and a pair of adjustable retractile stops 18 and 20. A friction element for cooperation with the drum comprises a primary shoe 22 and a secondary shoe 24, each including a web 26 supporting a rim 28 having secured thereto a friction lining 30 suitable for engagement with the drum 12, and mounted on the web of each of the shoes is an adjuster, indicated generally at 32, for cooperation with the drum 12 and the adjacent retractile stop.

The shoes are frictionally supported on the backing plate by conventional steady rests 34 and 36. The articulate ends of the shoes are connected by an automatic adjuster, indicated generally at 38. The force applying ends of the shoes normally embrace the anchor 14, and the motor 16 is suitably connected to the shoes adjacent their force applying ends. A spring 40 connects the shoes adjacent their articulate ends, and retractile springs 42 and 44 connect the shoes adjacent their force applying ends to the anchor 14. These springs serve to return the shoes to the retracted position upon conclusion of a braking operation, and to retain the shoes when in retracted position in engagement with the anchor 14 and the retractile stops 18 and 20.

Each of the shoe adjusters 32 includes a block 46 of any suitable material having a coefficient of friction lower than that of the linings 30 on the shoes, and the block 46 is frictionally clamped to the web 26 of the shoe. As shown, the block has two parallel slots 48 and 50 arranged therein bias with respect to the block for the reception of studs 52 and 54 mounted on the web of the shoe. The studs are provided with heads 56 and 58, and sleeved on the studs between the heads 56 and 58 and the block 46 are springs 60 and 62. One end of the block 46 is arcuate, as indicated at 64. This end of the block is extended through a slot in the rim 28, and the lining 30 of the shoe for cooperation with the drum 12, and the other end of the block cooperates with the adjacent retractile stop.

The automatic adjuster 38 connecting the articulate ends of the shoe includes a screw 66 having a bifurcated end 68 for the reception of the web 26 of one of the shoes, and a sleeve 70 is mounted for travel on this screw. The sleeve has at one end a circumferential flange 72, and the other end of the sleeve has an enlarged bore 74 providing an inner annular shoulder 76, and a plug 78 secured in the bore 74 seats on the shoulder 76. This plug 78 has a concentric reduced portion 80 and a concentric extension 82 having a longitudinal flat 84, the purpose of which will hereinafter appear.

A cap 86 receives the reduced portion 80 for rotation thereon. The cap has a head 88 provided with an extension 90 bifurcated as at 92 for the reception of the web 26 of one of the shoes. The cap 86 houses a disk brake, indicated generally at 94. The cap 86 has internal diametrically disposed slots 96, the purpose of which will hereinafter appear, and secured on the cap, preferably by a press fit, is a shell 98 having a flange 100. The shell 98 overhangs the sleeve 70 and serves to exclude dust and other foreign substances.

A torsion spring 102 connects the flange 72 on the sleeve 70 to the flange 100 on the shell 98. This spring tends to turn the sleeve 70 on the screw 66 and rotation of the sleeve is normally resisted by the brake 94. As shown, the brake includes a plurality of friction disks 104 mounted on the extension 82. The disks 104 are movable axially on the extension and are held against rotation with relation thereto by the longitudinal flat 84, and a plurality of friction disks 106 sleeved on the extension 82 in interleafing relation to the disks 104 are movable axially with relation to the extension and also with relation to the cap 86 and are held against rotation relative to the cap by tongs 108 on the disks received by the slots 96 in the cap, and this stack of friction disks 104 and 106 is held against displacement by a retaining ring 110 fitted in a groove in the extension 82 adjacent the free end thereof.

In a normal braking operation, upon energization of the motor 16, the friction elements 22 and 24 are moved from their retracted position on the stops 18 and 20 into engagement with the drum 12 against the resistance of the retractile springs 42 and 44 to effectively retard rotation of the drum.

During this operation, the linings 30 on the friction elements or shoes 22 and 24 and the arcuate ends 64 on the blocks 46 of the adjusters 32 engage the drum 12 simultaneously. The linings are of a high coefficient of friction, and they are subjected to the usual wear incident to a braking operation, while the blocks 46 are of a relatively low coefficient of friction and wear thereon is negligible. Because of this differential of friction between the linings and the blocks, during a normal braking operation there is relative movement between the blocks 46 and the shoes. Accordingly, upon conclusion of a braking operation and return of the shoes to retracted position, the blocks 46 engage the stops 18 and 20 and support the shoes in proper spaced relation to the drum.

When the shoes return to retracted position, under the influence of the retractile springs 42 and 44, the articulate ends of the shoes move apart against the resistance of the spring 40. This results in release of the brake 94, whereupon the torsion spring 102 becomes effective to rotate the sleeve 70 so as to take up slack and again engage the brake 94, to the end that upon a subsequent operation of the brake the adjuster 38 functions as a rigid thrust member or connection between the shoes 22 and 24.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake comprising a pair of braking elements, a turn buckle adjustment having threadedly engaged members connecting the articulated ends of said elements, a torsion spring acting on the threadedly engaged members of said turn buckle to elongate the same, and braking means imposing a frictional resistance to rotation upon said threadedly engaged members in addition to the frictional resistance of their threadedly engaged faces and in proportion to the compressive force exerted on said turn buckle by said braking elements.

2. A brake comprising a pair of braking elements, a turnscrew connecting the elements, means tending to turn the screw in one direction, and a disk brake for inhibiting reverse movement of the screw.

3. A brake comprising a pair of braking elements, an expansible member connecting the articulate ends of the elements, a torsion spring tending to extend the member, and a disk brake resisting contraction of the member.

4. A brake comprising a pair of braking elements, a member connecting the elements including a turn-screw, a disk brake for control of the screw, and a torsion spring tending to turn the screw.

5. A brake comprising a rotatable drum, a pair of braking elements for cooperation therewith, retractile stops for the elements, adjusters carried by the elements cooperating with the drum and stops for adjusting the elements, a turnbuckle connected between the elements, means tending to extend the buckle, and a disk brake resisting retraction of the buckle.

6. A brake comprising a fixed support, a rotatable drum associated therewith, a pair of braking elements on the support for cooperation with the drum, a retractile stop for each of the elements, means carried by each of the elements cooperating with the drum and associated stop for adjusting the elements proportionately to wear thereof, an extensible member connected between the articulate ends of the braking element, and a disk brake for control of the extension member.

7. An adjuster comprising a screw, a sleeve mounted for travel thereon, a plug secured in the sleeve, a plurality of disks movable axially on the plug and held against relative rotation, a cap supporting the plug for rotation, a plurality of disks in the cap movable axially therein and held against relative rotation and interleafed with the disks on the plug, and a torsion spring connected between the sleeve and the cap.

8. An adjuster comprising a screw having a bifurcated end, a sleeve mounted for travel on the screw, a plug secured in the free end of the sleeve having a concentric extension, a plurality of disks slidable on the extension and secured against relative rotation, a cap receiving the plug for rotation having a bifurcated extension, a plurality of disks in the cap slidable axially therein and secured against relative rotation and interleafed with the disks on the plug, and a torsion spring connected between the sleeve and cap.

9. An adjuster comprising a screw having a bifurcated end, a sleeve mounted for travel on the screw, a plug secured in the free end of the sleeve having a concentric extension, friction members on the extension, a cap supporting the plug for rotation having a bifurcated extension, friction members in the cap for cooperation with the friction members on the plug, a shell on the cap overhanging the sleeve on the screw, and a torsion spring connecting the sleeve and the cap.

ERWIN F. LOWEKE.